United States Patent [19]
Burke, Jr.

[11] 3,728,069

[45] Apr. 17, 1973

[54] THERMALLY RESPONSIVE FLASH LAMP SEQUENCING APPARATUS

[75] Inventor: Edward F. Burke, Jr., Reading, Mass.

[73] Assignee: Polaroid Corporation, Cambridge, Mass.

[22] Filed: July 6, 1971

[21] Appl. No.: 159,773

[52] U.S. Cl. ..................... 431/93, 95/11 L, 240/1.3
[51] Int. Cl. .............................................. F21k 5/02
[58] Field of Search ................. 431/93, 95; 95/11 L; 240/1.3

[56] References Cited

UNITED STATES PATENTS

| | | | |
|---|---|---|---|
| 1,667,569 | 4/1928 | Sorensen | 236/101 |
| 3,581,637 | 6/1971 | Harvey | 431/92 X |
| 3,583,301 | 6/1971 | Wareham | 95/11 L |

Primary Examiner—Carroll B. Dority, Jr.
Attorney—Charles Mikulka et al.

[57] ABSTRACT

Thermally responsive flash cube sequencing apparatus for use in or with a photographic camera successively advances the component lamps of a flash cube into a predetermined firing position. The sequencing apparatus includes a socket assembly for receiving a flash cube and thermally responsive indexing means for automatically indexing the socket assembly each time a lamp is ignited. The indexing apparatus comprises a pre-stressed thermally expansible sensing element disposed to receive a pulse of thermal energy from an ignited flash lamp. Thermal expansion and subsequent contraction of the sensing element actuates an escapement mechanism which controls the advancement of the socket assembly through four index positions effective to bring the individual flash lamps in the cube successively into the said firing position.

35 Claims, 6 Drawing Figures

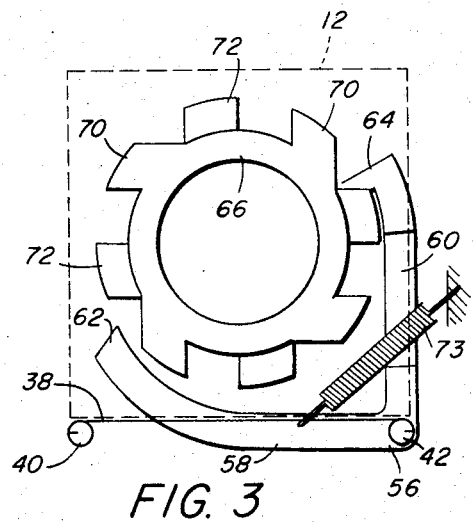
FIG. 3
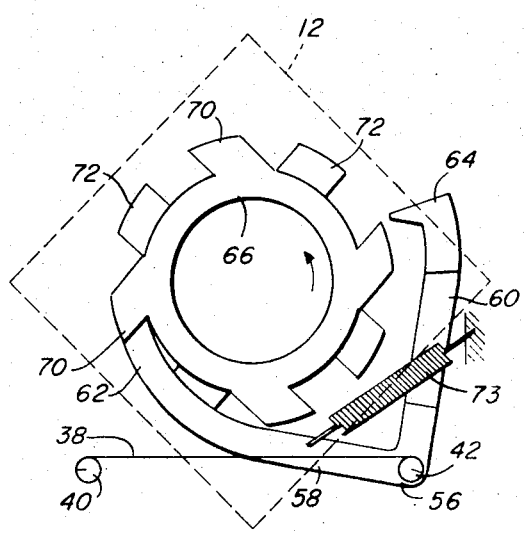
FIG. 4
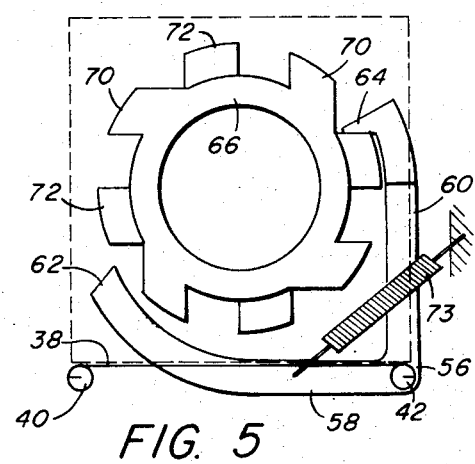
FIG. 5
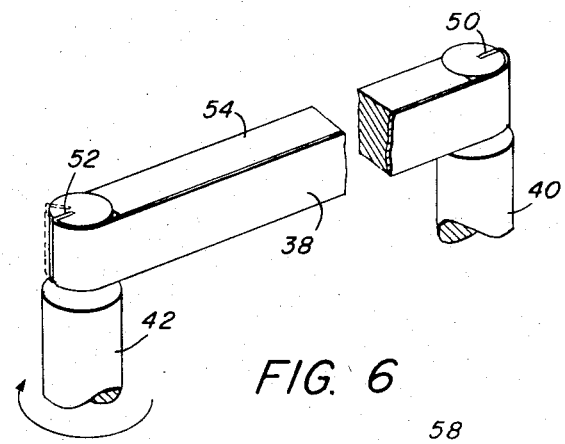
FIG. 6
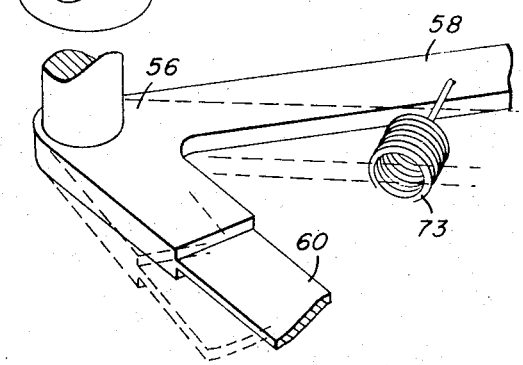

THERMALLY RESPONSIVE FLASH LAMP SEQUENCING APPARATUS

BACKGROUND OF THE INVENTION

Since the advent in hand-held photography of multilamp flash assemblies, such as the four lamp "flash cube," there have been explored a great many approaches to meeting the lamp sequencing requirement which evolved as a natural consequence of the use of multilamp flash assemblies. The general solution to the problem, at least as applied to sequencing of the lamps in a flash cube, has been to incorporate in hand-held cameras rotatable socket structures which are advanced in any of a number of ways after each ignition of a lamp in a flash cube.

Manual indexing of the cube by the user is practical but requires that the user remember to rotate the flash cube after each lamp ignition. A common method of achieving advancement of the flash cube automatically is to couple the camera's shutter actuating mechanism with a flash cube socket which is given a torsional preload by the user. Operation of the shutter actuator trips a latch which allows the socket to rotate to its next succeeding index position, thereby locating an unused lamp in the firing position.

This approach has been implemented and is in widespread use; however, it has a number of drawbacks. Coupling of the socket indexing mechanism to the shutter actuator imposes an undesirable loading of the shutter actuating mechanism by the indexing mechanism. Further, this arrangement establishes a structural dependency of the cube indexing apparatus on the shutter mechanism. In addition, the requisite coupling linkages are apt to impose severe constraints on the design of the associated camera front assembly.

The desirability of having a cube indexing device which operates automatically and yet is not dependent on or inhibitive of camera components has been recognized, as evidenced for example by U.S. Pat. No. 3,312,086 — Casebeer et al. That patent discloses an electromagnetic socket latching mechanism which is triggered by a photoresponsive control circuit sensing light emitted by an ignited lamp.

Another approach, depicted in U.S. Pat. No. 3,583,301, owned by the assignee of this invention, teaches the use in a flash cube indexing device of a bimetallic strip which is deflected by thermal radiation from an ignited flash lamp to free a cube-retaining socket for rotation to a succeeding index position.

OBJECTS OF THE INVENTION

It is an object of this invention to provide for use in or with a photographic camera an improved flash lamp sequencing device for receiving a multi-lamp flash assembly such as a flash cube and for successively advancing the individual lamps of the flash assembly into a predetermined firing position.

It is another object to provide flash cube indexing apparatus which is responsive to and automatically triggered by thermal radiation from an ignited flash lamp.

In a broader sense, it is an object to provide a thermally responsive control device which is especially useful for controlling rotation of a base or platform, such as a flash cube socket, and which has an improved thermal sensing mechanism. It is an object to provide a thermally responsive control device of the nature and purpose described which is extremely sensitive and quick to respond, and which develops in a control member a large working displacement useful for performing control functions.

It is yet another object to provide an improved thermally responsive self-contained flash cube indexing device which is operable automatically and independently of any direct manual control or input, which is structurally simple and compact, which is reliable in operation, and yet which is relatively inexpensive to manufacture.

Further objects and advantages of the invention will in part be obvious and will in part become apparent as the following description proceeds. The features of novelty which characterize the invention will be pointed out with particularity in the claims annexed to and forming a part of this specification.

DESCRIPTION OF THE DRAWINGS

For a fuller understanding of the invention, reference may be had to the following detailed description taken in connection with the accompanying drawings wherein:

FIGS. 3 – 5 are time sequence diagrams illustrating the operation of a thermally responsive escapement mechanism implementing an important aspect of this invention; and FIG. 6 is an enlarged fragmentary perspective view of a thermal sensing mechanism shown in FIGS. 1 – 5.

DESCRIPTION OF THE PREFERRED EMBODIMENTS

In a general sense this invention is directed to the provision of improved thermally responsive control apparatus. The drawings illustrate a photoflash device incorporating a flash lamp sequencing device representing a preferred implementation of the principles of this invention. The sequencing device receives a multilamp flash assembly of the "flash cube" type and successively advances component lamps of the flash assembly into a predetermined firing position.

Figure 1:
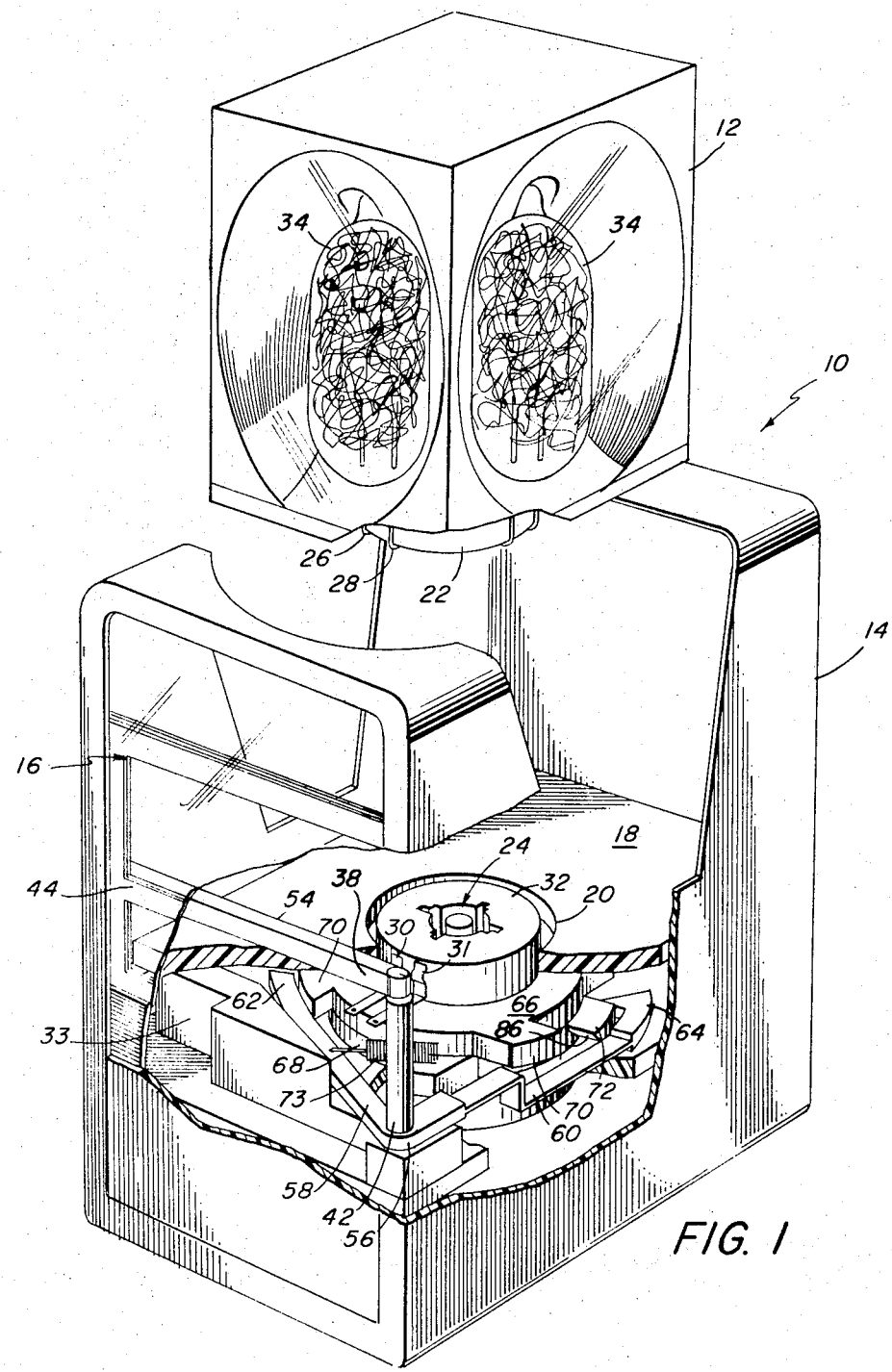
FIG. 1 is a perspective view of a novel photoflash device, partially broken away and with non-germane components removed to reveal structure implementing the invention.

FIG. 1 illustrates this invention embodied in a photoflash device 10 manufactured and sold commercially by the assignee of this invention and more fully described in U.S. Pat. application, Ser. No. 101,336, filed Dec. 24, 1970, in the name of Bruce K. Johnson. The device is designed to receive commercially available multilamp flash assemblies of the "flash cube" type, more particularly flash cubes of the "high output" type, a representative one of which is illustrated schematically at 12. The photoflash device 10 is shown schematically as including a housing 14 which has an adjustable apertured plate assembly 16 in a forward window thereof providing selective control of the effective light output from the device 10.

The photoflash device 10 includes a floor 18 having a circular opening 20 for receiving a terminal ring 22 on the flash cube 12. The device 10 includes a novel socket assembly (more fully described in U.S. Pat. application, Ser. No. 51,249, filed June 30, 1970, and commonly assigned herewith) having a receptor 24 for engaging and holding a downwardly extending post (not shown) on the flash cube 12.

A pair of electrical contacts for engaging the forward pair of flash lamp terminals 26, 28 on terminal ring 22 of the flash cube 12 are shown schematically at 30, 31. Other non-germane components of the photoflash device 10 and socket assembly have been removed so as not to obscure the structure of the invention and its method of operation.

Figure 2:
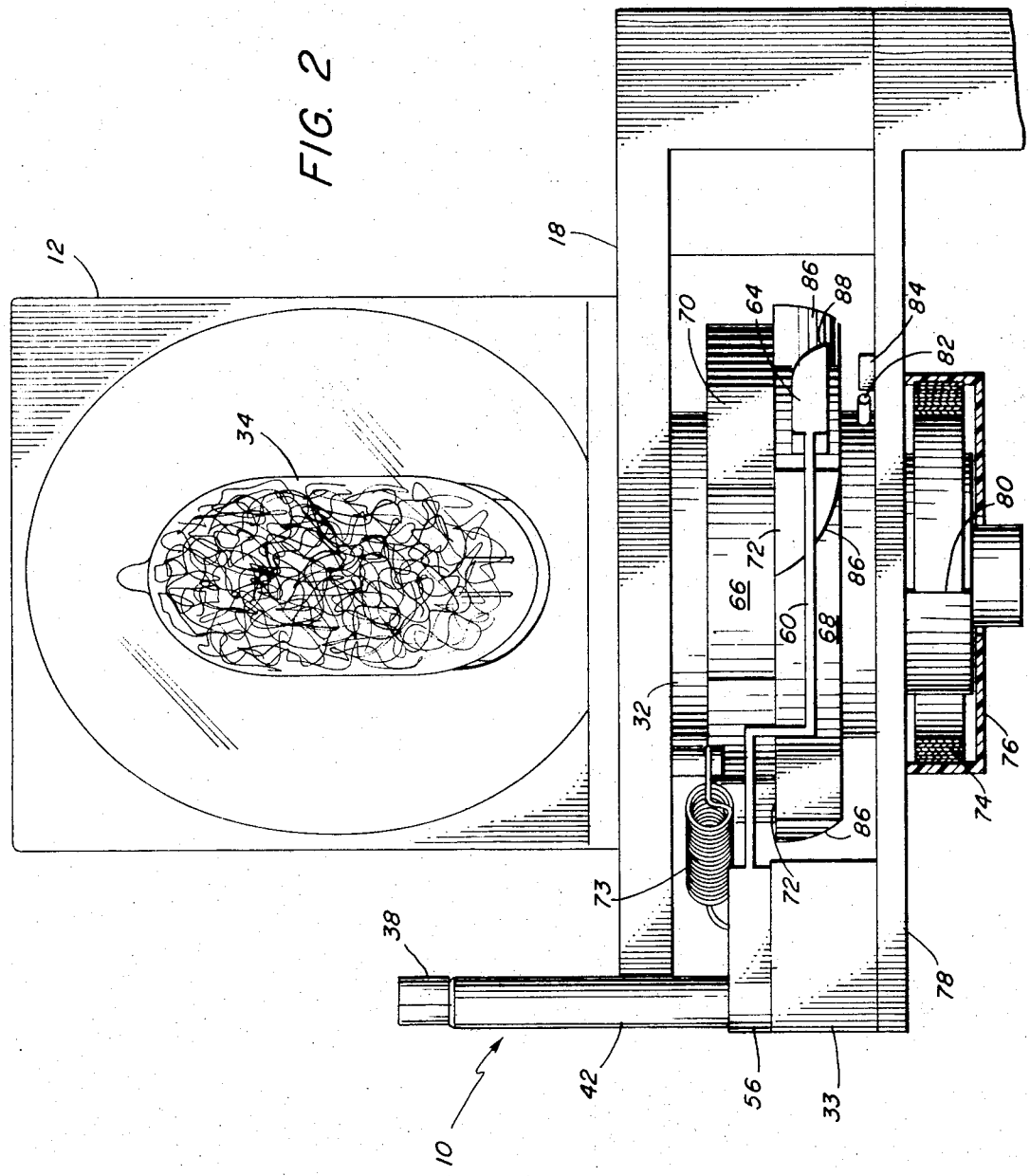
FIG. 2 is a fragmentary side elevational view, partially sectioned, of the photoflash device shown in FIG. 1.

As shown with particular clarity in FIG. 2, the socket assembly includes a socket body 32 supported for rotation by a chassis 33 for the photoflash device 10. In accordance with this invention, there is provided thermally responsive socket indexing means for rotating the socket assembly through four quadrature index positions effective to locate the four component lamps 34 of the flash cube 12 successively in a predetermined, forwardly facing firing position. The terminals 26, 28 of a lamp 34 in the firing position are in operative electrical engagement with contacts 30, 31, through which electrical power is supplied to ignite the lamps 34.

The socket indexing means includes, in a general sense, a thermal sensing element disposed to receive a pulse of thermal radiation from an ignited flash lamp. The sensing element increases in length by a predetermined increment due to thermal expansion when the pulse of thermal energy is received. Control means coupled to the cube-holding socket and responsive to the expansion and subsequent contraction of the sensing element effects movement of the socket from one index position to a next succeeding index position each time a lamp is ignited.

It is a stated object of this invention that the sensing element be highly sensitive and fast acting. To this end, in the illustrated preferred embodiment, the element is shown as comprising an elongated ribbon or band 38 supported by a pair of spindles 40, 42, described below. In order that the band 38 may be located withing the primary radiation field of a lamp 34 ignited in the firing position without interfering with the operation of the apertured plate assembly 16, the band 38 is supported behind and in registration with the opaque central portion of a fixed apertured plate 44 comprising part of the assembly 16.

The band 38 is preferably composed of a material selected to have a high coefficient of expansion so as to provide a maximized elongation for a given amount of thermal energy absorbed. To optimize the sensitivity of the band 38 while minimizing its response time, the area of the band is maximized and its thickness is chosen to be as small as practicable.

A device constructed as illustrated has operated very satisfactorily employing a black passivated stainless steel band approximately 0.002 inch thick, 0.10 inch wide, and 1.3 inches long. A band having these specifications has been found to heat very rapidly in 40 milliseconds to temperatures in the order of approximately 600° F, when used with commercial AG-1 high-output lamps providing a very rapid response.

In order to produce a satisfactorily large working displacement for controlling an indexing movement of the socket assembly, amplifying means are provided for detecting the expansion increment of the band 38 and for amplifying it to produce in a control member a working displacement substantially greater than the expansion increment. In the illustrated embodiment, the band 38 is held at opposite ends in slots 50, 52 in the spindles 40, 42. Spindle 40 is anchored in the chassis 33; spindle 42 is supported for rotation. The separation of the spindles 40, 42 is accurately preserved by the use of a spacer bar 54 having concave cylindrical end surfaces mating with the outer surfaces of the ends of the spindles 40, 42. The mating surfaces between the spacer bar 54 and the rotatable spindle 42 are preferably lubricated in order to minimize the surface frictional forces acting to inhibit rotation of the spindle 42.

In accordance with this invention, linear expansion of the band 38 is translated into an angular displacement of the rotatable spindle 42. In the illustrated embodiment, this angular displacement of the rotatable spindle 42 is amplified by the use of a pawl 56 comprising part of a novel escapement mechanism which effects an indexing movement of the socket assembly. The pawl 56 is illustrated as having a pair of arms 58, 60 having at their distal ends pallets 62, 64, respectively. The pawl 56 cooperates with escape wheel means coupled to the socket body 32. The escape wheel means is here shown as having, according to this invention, eight teeth, each of which has an operative latching surface, alternate teeth being axially offset to establish two axially separated escape wheels 66, 68 which are angularly displaced by approximately 45°. The escape wheels 66, 68 are affixed to and coaxial with the socket body 32 and have escape teeth 70, 72, respectively. The escape teeth 70, 72 are so positioned on the escape wheels 66, 68 as to establish appropriate quadrature index positions of the socket assembly.

Arm 58 of the pawl 56 interacts with the escape teeth 70 on escape wheel 66; arm 60 is axially offset from the arm 58 and interacts with the escape teeth 72 on escape wheel 68. By the employment of a pair of axially separated escape wheels and a pawl having offset arms, as described, an escapement mechanism is provided which allows a full 90° rotation of the socket body 32 (the equivalent of two escape teeth) for each oscillatory cycle of the pawl 56, and further insures a positive, no-slip, escapement action.

It is extremely important in order to maximize the response of the pawl 56 to any thermal elongation in the band 38, that all slack or play in the mechanism be removed. To this end, a tension spring 73 is provided for imposing a relatively high initial torque on the rotatable spindle 42. In the illustrated embodiment, the spring 73 is connected between arm 58 and the chassis 33 of the photoflash device 10. The spring 73 exerts a high initial tensile stress on the band 38—for example, 40,000 psi which is sufficient to stretch the band by a few thousands of an inch, thus insuring that all slack which might exist in the band or in the coupling to the pawl 56 is taken up.

As shown in FIG. 6, the band 38, upon receipt of a pulse of thermal radiation from a flash lamp 34 ignited in the firing position, elongates by a predetermined increment, allowing the tension spring 73 to rotate the pawl 56 from a cold rest position to an opposite limit position (shown in broken lines in FIG. 6) through a predetermined angular displacement, the magnitude of which is determined by the elongation of the band 38. A device having a band 38 as above specified has consistently produced, when used with commercial AG-1 high-output lamps, as manufactured by the General Electric Company, an elongation increment of approximately 0.004 inch average. By the use of the described amplification means, this 0.004 inch expansion increment of the band 38 is translated into an angular displacement of 7.5° in the pawl to produce a satisfactorily large working displacement of the pallets 62, 64 at the distal ends of the arms 58, 60.

In order to provide a driving torque for rotating the socket assembly, there is provided motive means which may take various forms, but is here shown as a coiled torsion spring 74. A casing 76 affixed to a base plate 78 secured to the chassis 33 of the photoflash device 10 encloses the torsion spring 74 and retentively engages the outer end of the spring 74. The inner end of the torsion spring 74 is received in a diametric slot 80 in the socket body 32.

As will be explained in more detail hereinafter, the photoflash device 10 is prepared for operation by the user's insertion of a flash cube 12 into the socket assembly and manual winding of the flash cube through one revolution until a lug 82 extending from the socket body 32 engages an abutment 84 on the base plate 78. Winding of the socket body 32 relative to the chassis 33 causes the torsion spring 74 to be loaded to a state of stress wherein it is capable of driving the socket assembly through a full 360° rotation.

During the described wind-up operation, the escapement mechanism functions as a ratchet, allowing the socket body 32 to be counter-rotated against the interferring pallet 64 on arm 60. This is accomplished by the provision of axial camming surfaces 86 on the teeth 72 of escape wheel 68. The arm 60 of the pawl 56 is resilient and capable of being laterally deflected by the camming surfaces 86 on the escape teeth 72 so as to clear the teeth 72 when the socket assembly is counter-rotated against the forces generated by the torsion spring 74. In the illustrated embodiment, the pallet 64 has formed integrally thereon a cam follower surface 88 which cooperates with the camming surface 86 on the escape teeth 72 in order to enhance the smoothness of the rewind operation.

The operation of the escapement mechanism can be understood from the FIG. 3 – 5 diagrams. Assume that the socket assembly has been wound in a clockwise direction against the torsion spring 74, an that the escape wheels 66, 68 have been therefore placed under a state of counterclockwise torsional bias. FIG. 3 shows the escapement mechanism in its rest (cold) state with pallet 64 engaging one of the escape teeth 72 on escape wheel 68. Upon ignition of a flash bulb, the band 38 expands through a predetermined increment, allowing the tension spring 73 to rotate the pawl 56 in a clockwise direction to free escape tooth 72 from pallet 64. The socket assembly is thus free to rotate 45° to the position shown in FIG. 4 wherein pallet 62 on arm 58 of the pawl 56 abuts one of the escape teeth 70 on escape wheel 66. The flash cube (represented by the broken outline) pauses momentarily in this intermediate 45° position.

Subsequent contraction of the band 38 due to cooling thereof causes the pawl 56 to rock in a counter-clockwise direction to free the escape wheel 66 from the pallet 62, permitting rotation of the socket assembly to the next succeeding quadrature index position, as shown in FIG. 5. The cycle is thus complete and the indexing mechanism is in a state of readiness for ignition of a flash lamp 34 and another indexing operation.

The invention is not limited to the particular details of construction of the embodiments depicted, and it is contemplated that various and other modifications and applications will occur to those skilled in the art. For example, numerous sensing elements other than the particular band shown may be employed. Other control members for amplifying the expansion increment of the sensing element are envisioned. The principles of this invention are applicable for purposes other than indexing of multilamp flash assemblies for use in or with a photographic camera. Means for tensioning the band other than the tension spring 73 are contemplated. Therefore, because certain changes may be made in the above-described apparatus without departing from the true spirit and scope of the invention herein involved, it is intended that the subject matter of the above depiction shall be interpreted as illustrative and not in a limiting sense.

What is claimed is:

1. For use in or with a photographic camera, a flash lamp sequencing device for receiving a multilamp flash assembly and for successively advancing component lamps of the flash assembly into a predetermined firing position, comprising:
   socket means for receiving and retaining a multilamp flash assembly; and
   socket indexing means for advancing said socket means through a plurality of index positions effective to locate the component lamps of the flash assembly successively in said firing position, comprising:
   thermally responsive means including a sensing element of unitary mass and having a uniform coefficient of expansion disposed to receive a predetermined input of thermal energy from a lamp ignited in said firing position, said element increasing in length by a predetermined increment due to thermal expansion when said predetermined input of thermal energy is received, and
   means coupled to said socket means and responsive to said thermally responsive means for effecting movement of said socket means from one of said index positions to the next succeeding index position each time a lamp is ignited.

2. The apparatus defined by claim 1, wherein said element is an elongated metallic member.

3. The apparatus defined by claim 2, wherein said member comprises a thin, flat, darkened band.

4. For use in or with a photographic camera, a flash lamp sequencing device for receiving a multilamp flash assembly and for successively advancing component lamps of the flash assembly into a predetermined firing position, comprising:
   socket means for receiving and retaining a multilamp flash assembly; and
   socket indexing means for advancing said socket means through a plurality of index positions effective to locate the component lamps of the flash assembly successively in said firing position, comprising:

thermal sensing means disposed to receive a predetermined input of thermal energy from a lamp ignited in said firing position, said sensing means increasing in physical size by a predetermined increment due to thermal expansion when said predetermined input of thermal energy is received, amplifying means for detecting said increment in size of said sensing means and amplifying it to produce in a control member a working displacement substantially greater than said increment, and means responsive to movement of said control member through said working displacement for effecting movement of said socket means from one of said index positions to a succeeding index position thereof each time a lamp is ignited.

5. The apparatus defined by claim 4, wherein said sensing means has a relatively high thermal conductance.

6. The apparatus defined by claim 5, wherein said sensing means comprises a thin, flexible metallic band.

7. The apparatus defined by claim 4, wherein said socket indexing means includes means for applying a tensive force on said sensing means.

8. The apparatus defined by claim 7, wherein said sensing means is an elongated flexible band and wherein said tensing means includes a fixed first spindle for holding one end of said band and a rotatably mounted second spindle for holding and winding the opposite end of said band, said control member being affixed to and extending radially from said second spindle for magnifying angular displacements of said second spindle, said tensing means further including spring means acting on said control member for exerting a predetermined tensile stress on said band, whereby upon ignition of a lamp said band expands lengthwise by said predetermined increment, thereby permitting said control member to be angularly displaced by said spring means to develop at its distal end said working displacement.

9. The apparatus defined by claim 8, wherein said sensing means comprises a thin, flat, blackened metallic band.

10. The apparatus defined by claim 4, wherein said socket indexing means includes mounting means mounting said socket means for rotation about a fixed axis, and wherein said indexing means further includes motive means coupled to said socket means for developing a driving torque on said socket means.

11. The apparatus defined by claim 8, wherein said socket indexing means includes mounting means mounting said socket means for rotation about a fixed axis, and wherein said indexing means further includes motive means coupled to said socket means for developing a driving torque on said socket means.

12. The apparatus defined by claim 11, wherein said socket indexing means includes an escapement mechanism comprising escape wheel means connected to said socket means, said control member comprising a pawl mounted to oscillate and having a pair of arms embracing said escape wheel means, said arms having at their respective distal ends a pair of pallets which alternately engage escape teeth which are positioned on said escape wheel means so as to establish said index positions of said socket assembly means, the thermal expansion and subsequent contraction of said band when a lamp is ignited causing said pawl to rock and free said escape wheel means to permit rotation of said socket means under the influence of said motive means toward said succeeding index position thereof.

13. The apparatus defined by claim 12, wherein alternate escape teeth on said escape wheel means are axially offset to effectively establish two angularly displaced, axially separated escape wheels, said arms of said pawl being offset one from the other for engaging said axially separated escape wheels, whereby in each oscillatory cycle of said pawl said escape wheel means, and thus said socket means, advances angularly the equivalent of two teeth.

14. The apparatus defined by claim 13, wherein a predetermined one of said arms engages escape teeth on a predetermined one of said axially separated escape wheels when said device is in its rest state, wherein said teeth on said predetermined one of said escape wheels each have an axial camming surface, and wherein said predetermined one of said arms is resilient and is deflected laterally by said camming surfaces on said teeth so as to clear said teeth when said socket assembly is counter-rotated against the bias provided by said motive means.

15. For use in or with a photographic camera, a flash lamp sequencing device for receiving a multilamp flash assembly and for successively advancing component lamps of the flash assembly into a predetermined firing position, comprising:

socket means for receiving and retaining a multilamp flash assembly;

means mounting said socket means for rotation; and socket indexing means for rotating said socket means through a plurality of index positions effective to locate the component lamps of the flash assembly successively in said firing position, comprising:

thermal sensing means disposed to receive a predetermined input of thermal energy from a lamp ignited in said firing position, said sensing means increasing in length due to thermal expansion when said predetermined input of thermal energy is received, motive means for applying a driving torque on said socket means, and an escapement mechanism including escape wheel means coupled to said socket means and having escape teeth positioned on said escape wheel means so as to establish said index positions of said socket means, a pawl having a pair of arms embracing said escape wheel means, said arms having at their respective distal ends a pair of pallets which alternately engage said escape teeth on said escape wheel means, and pawl drive means responsive to expansion and subsequent contraction of said sensing means for oscillating said pawl each time a lamp is ignited to release said escape wheel means and thereby permit rotation of said socket means by said motive means to the next succeeding index position thereof.

16. The apparatus defined by claim 15, wherein said pawl drive means includes tensing means for applying a tensive force on said sensing means.

17. The apparatus defined by claim 15, wherein alternate escape teeth on said escape wheel means are axially offset to effectively establish two angularly displaced, axially separated escape wheels, said arms of said pawl being offset one from the other in different planes for engaging said axially separated escape wheels, whereby in each oscillatory cycle of said pawl said escape wheel means, and thus said socket means, advances angularly the equivalent of two teeth.

18. The apparatus defined by claim 17, wherein said tensing means includes a fixed first spindle for holding one end of said sensing means and a rotatably mounted second spindle for holding and winding the opposite end of said sensing means, said pawl being affixed to and extending radially from said second spindle for magnifying any angular displacement of said second spindle, said tensing means further including spring means acting on said pawl for exerting a predetermined tensile stress on said sensing means, whereby upon ignition of a lamp said sensing means expands lengthwise, thereby permitting said pawl to be angularly displaced by said spring means.

19. For use in or with a photographic camera, flash apparatus for receiving and rotationally indexing a flash cube to successively locate component lamps in the flash cube in a predetermined firing position, comprising:
socket means for receiving and retaining a flash cube;
electrical contact means supported to engage electrical terminals of a component flash lamp located in said firing position;
means mounting said socket means for rotation; and
socket indexing means for rotating said socket means through four quadrature index positions effective to locate the four component lamps of the flash cube successively in said firing position, comprising:
an elongated thermal sensing element disposed to receive a predetermined input of thermal energy from a lamp ignited in said firing position, said sensing element increasing in length due to thermal expansion by a predetermined increment when said predetermined input of thermal energy is received,
motive means for applying a driving torque on said socket means, and
an escapement mechanism including escape wheel means coupled to said socket means and having escape teeth positioned on said escape wheel means so as to establish said index positions of said socket means, a pawl having a pair of arms embracing said escape wheel means, said arms having at their respective distal ends a pair of pallets which alternately engage said escape teeth on said escape wheel means, and pawl drive means responsive to expansion and subsequent contraction of said sensing means for oscillating said pawl each time a lamp is ignited to release said escape wheel means and thereby permit rotation of said socket means by said motive means to the next succeeding index position thereof.

20. The apparatus defined by claim 19, wherein said escape wheel means has eight spaced teeth, alternate escape teeth being axially offset to effectively establish two axially separated escape wheels which are angularly displaced by 45°, said arms of said pawl being offset one from the other in different planes for engaging said axially separated escape wheels, whereby in each oscillatory cycle of said pawl said escape wheel means, and thus said socket means, advances 90°.

21. The apparatus defined by claim 20, wherein a predetermined one of said arms engages escape teeth on a predetermined one of said axially separated escape wheels when said device is in its rest state, wherein said teeth on said predetermined one of said escape wheels each have an axial camming surface, and wherein said predetermined one of said arms is resilient and is deflected laterally by said camming surfaces on said teeth so as to clear said teeth when said socket means is counter-rotated against the bias provided by said motive means.

22. The apparatus defined by claim 19, wherein said pawl drive means includes tensing means for applying a tensive force on said sensing element.

23. The apparatus defined by claim 22, wherein said sensing element is an elongated flexible band and wherein said tensing means includes a fixed first spindle for holding one end of said band and a rotatably mounted second spindle for holding and winding the opposite end of said band, said pawl being affixed to and extending radially from said second spindle for magnifying angular displacements of said second spindle, said tensing means further including spring means acting on said pawl for exerting a predetermined tensile stress on said band.

24. The apparatus defined by claim 23, wherein said escape wheel means has eight equally spaced teeth, alternate escape teeth being axially offset to effectively establish two axially separated escape wheels which are angularly displaced by 45°, said arms of said pawl being offset one from the other in different planes for engaging said axially separated escape wheels, wherein in each oscillatory cycle of said pawl said escape wheel means, and thus said socket means, advances 90°.

25. The apparatus defined by claim 24, wherein said sensing element comprises a thin metallic band.

26. For use with a photographic camera, a flash lamp sequencing device for successively advancing component lamps of a multilamp flash assembly into a predetermined firing position, comprising:
socket means for receiving and retaining a multilamp flash assembly, said socket means defining a plurality of latch surfaces associated with a number of index positions of said socket means;
means for mounting said socket means for rotation;
motive means for applying a driving torque on said socket means; and
socket indexing means for advancing said socket means through said index positions effective to locate the component lamps of the flash assembly successively in said firing position, comprising:
a sensing element disposed adjacent said flash assembly so as to receive thermal energy from a lamp ignited in said firing position, said element having the characteristic that its physical size is altered by a predetermined increment due to thermal expansion when a lamp having a predetermined output of thermal energy is ignited in said firing position, amplifying means for detecting said predetermined size increment in said element and amplifying it to produce in a control member a working displacement substantially greater than said increment, said control member being mounted to move from a first limit of said working displacement wherein it is in retentive engagement with one of said latch surfaces on said socket means to an opposite limit of said working displacement wherein it is disengaged from said socket means, whereby said socket means is automatically released to move toward a next succeeding index position under the influence of said motive means when a lamp is fired, and means for stopping said socket means in said next succeeding index position.

27. The apparatus defined by claim 26, wherein said sensing element comprises a thin blackened metallic band.

28. Thermally responsive control apparatus, comprising:

a thermal sensing element disposed to receive thermal energy from a thermal source to be monitored, said sensing element increasing in length by a predetermined increment due to thermal expansion when a predetermined input of thermal energy is received;

tensing means for applying a tensive force on said sensing element, said tensing means including a fixed first spindle for holding one end of said element, a rotatably mounted second spindle for holding and winding the opposite end of said element, and spring means for exerting a torque on said second spindle to develop a predetermined tensile stress on said element whereby upon receipt of said predetermined input of thermal energy, said element expands lengthwise by said predetermined increment, thereby permitting said second spindle to be rotated through a predetermined angular displacement by said spring means;

a control member affixed to and extending radially from said second spindle for magnifying angular displacements of said second spindle to develop at the distal end of said control member a working displacement useful for control purposes.

29. The apparatus defined by claim 28, wherein said sensing means has a relatively high coefficient of expansion.

30. The apparatus defined by claim 29, wherein said sensing element comprises a thin, flexible metallic band.

31. Thermally responsive indexing apparatus, comprising:

base means to be indexed;

means mounting said base means for rotation; and base indexing means for advancing said base means through a plurality of angularly separated index positions, comprising:

thermal sensing means disposed to receive thermal energy from a thermal source to be monitored, said sensing means increasing in length by at least a predetermined increment due to thermal expansion when a pulse of thermal energy having at least a predetermined minimum energy value is received, motive means for applying a driving torque on said base means, and an escapement mechanism including escape wheel means coupled to said base means and having escape teeth positioned on said escape wheel means so as to establish said index positions of said base means, a pawl having a pair of arms embracing said escape wheel means, said arms having at their respective distal ends a pair of pallets which alternately engage said escape teeth on said escape wheel means, and pawl drive means responsive to expansion and subsequent contraction of said sensing means for oscillating said pawl each time said pulse of thermal energy is emitted by the source to release said escape wheel means and thereby permit rotation of said base means by said motive means to the next succeeding index position thereof.

32. The apparatus defined by claim 31, wherein said pawl drive means includes tensing means for applying a tensive force on said sensing means.

33. The apparatus defined by claim 31, wherein alternate escape teeth on said escape wheel means are axially offset to effectively establish two angularly displaced, axially separated escape wheels, said arms of said pawl being offset one from the other in different planes for engaging said axially separated escape wheels, whereby in each oscillatory cycle of said pawl said escape wheel means, and thus said base means, advances angularly the equivalent of two teeth.

34. The apparatus defined by claim 33, wherein a predetermined one of said arms engages escape teeth on a predetermined one of said axially separated escape wheels when said device is in its rest state, wherein said teeth on said predetermined one of said escape wheels each have an axial camming surface, and wherein said predetermined one of said arms is resilient and is deflected laterally by said camming surfaces on said teeth so as to clear said teeth when said socket assembly is counter-rotated against the bias provided by said motive means.

35. The apparatus defined by claim 33, wherein said tensing means includes a fixed first spindle for holding one end of said sensing means and a rotatably mounted second spindle for holding and winding the opposite end of said sensing means, said pawl being affixed to and extending radially from said second spindle for magnifying any angular displacement of said second spindle, said tensing means further including spring means acting on said pawl for exerting a predetermined tensile stress on said sensing means, whereby upon receipt of a thermal pulse said sensing means expands lengthwise, thereby permitting said pawl to be angularly displaced by said spring means.

* * * * *